United States Patent [19]

Beese et al.

[11] 4,196,621
[45] Apr. 8, 1980

[54] DEVICES FOR DETECTING FLUID FLOW

[75] Inventors: John G. Beese, Lisvane; Robert M. Peters, Lakeside; Malcolm V. Wade, Cathays, all of Wales

[73] Assignee: National Research Development Corporation, London, England

[21] Appl. No.: 917,725

[22] Filed: Jun. 21, 1978

Related U.S. Application Data

[63] Continuation of Ser. No. 742,183, Nov. 16, 1976, abandoned.

[30] Foreign Application Priority Data

Nov. 20, 1975 [GB] United Kingdom ............... 47799/75

[51] Int. Cl.$^2$ ............................................. G01F 1/32
[52] U.S. Cl. ................................................. 73/194 VS
[58] Field of Search ................................. 73/194 VS

[56] References Cited

U.S. PATENT DOCUMENTS

| | | | |
|---|---|---|---|
| 1,215,135 | 2/1917 | Fisher | 73/194 |
| 1,935,445 | 11/1933 | Heinz | 73/194 |
| 2,809,520 | 10/1957 | Richard, Jr. | 73/194 |
| 3,452,594 | 7/1969 | Dale | 73/194 |
| 3,473,377 | 10/1969 | Reinecke | 73/194 |
| 3,696,673 | 10/1972 | Ribner et al. | 73/194 |
| 3,863,501 | 2/1955 | Janssen et al. | 73/194 |
| 3,867,839 | 2/1975 | Herzl | 73/194 |
| 3,878,716 | 4/1975 | Asada | 73/194 |
| 3,946,608 | 3/1976 | Herzl | 73/194 |
| 4,069,708 | 1/1978 | Fussell | 73/194 |

OTHER PUBLICATIONS

Yamasaki et al. "The Karmen Vortex Flowmeter", in J. Soc. Contr. Eng. (Japan), vol. 10 #3, pp. 173-188.

*Primary Examiner*—Herbert Goldstein
*Attorney, Agent, or Firm*—Cushman, Darby & Cushman

[57] ABSTRACT

In a device for detecting fluid flow, an elongated body, such as a wire, is supported so that when a substantial portion of its length is exposed to a flowing fluid with the longitudinal axis of said portion arranged substantially transverse to the fluid flow, said portion can be caused to vibrate by vortex shedding; an electromechanical transducer is coupled to the body so as to produce an electrical signal in response to the vibration; and either the presence of the electrical signal is detected, for operation as a safety switch, or the frequency of the vibrations is detected, for measurement of fluid flow rate, fluid velocity etc.

2 Claims, 11 Drawing Figures

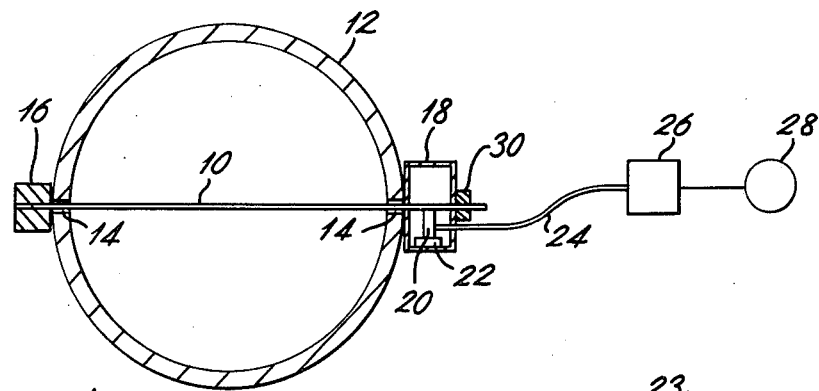
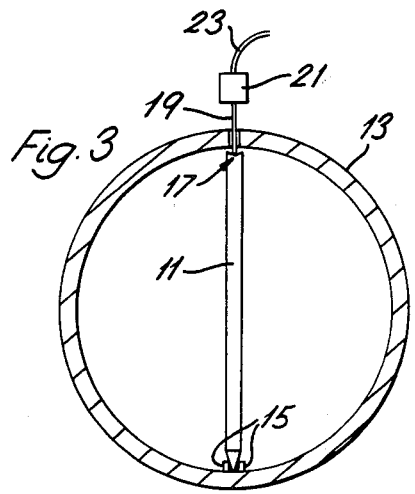
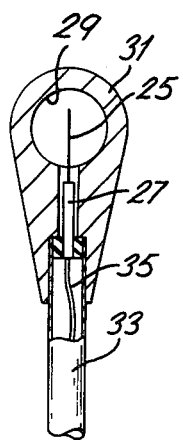
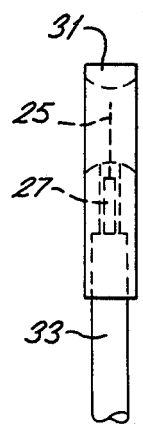
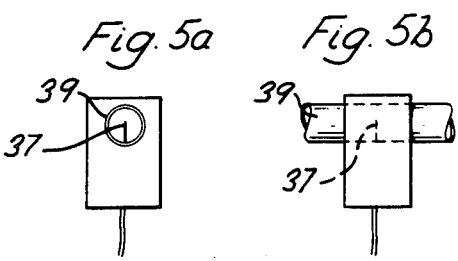
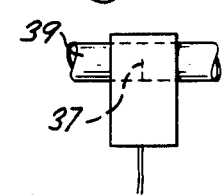
Fig. 1
Fig. 3
Fig. 4a  Fig. 4b
Fig. 5a  Fig. 5b

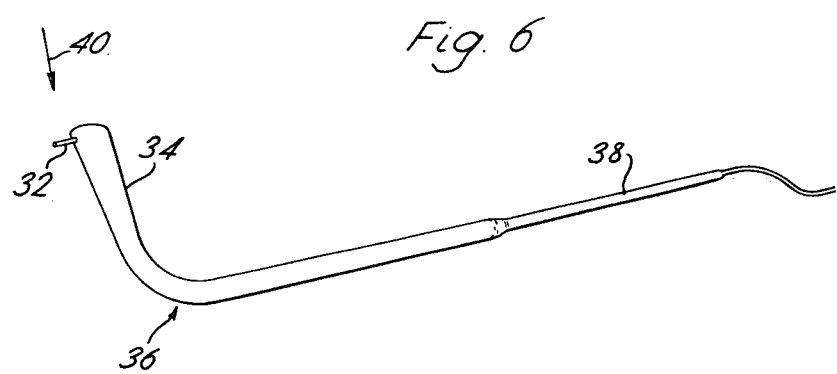
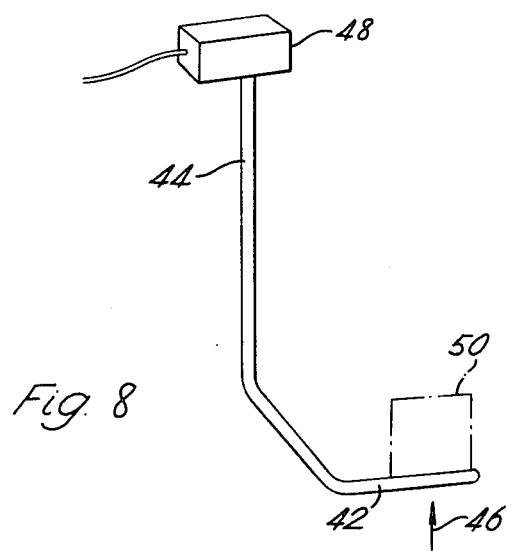

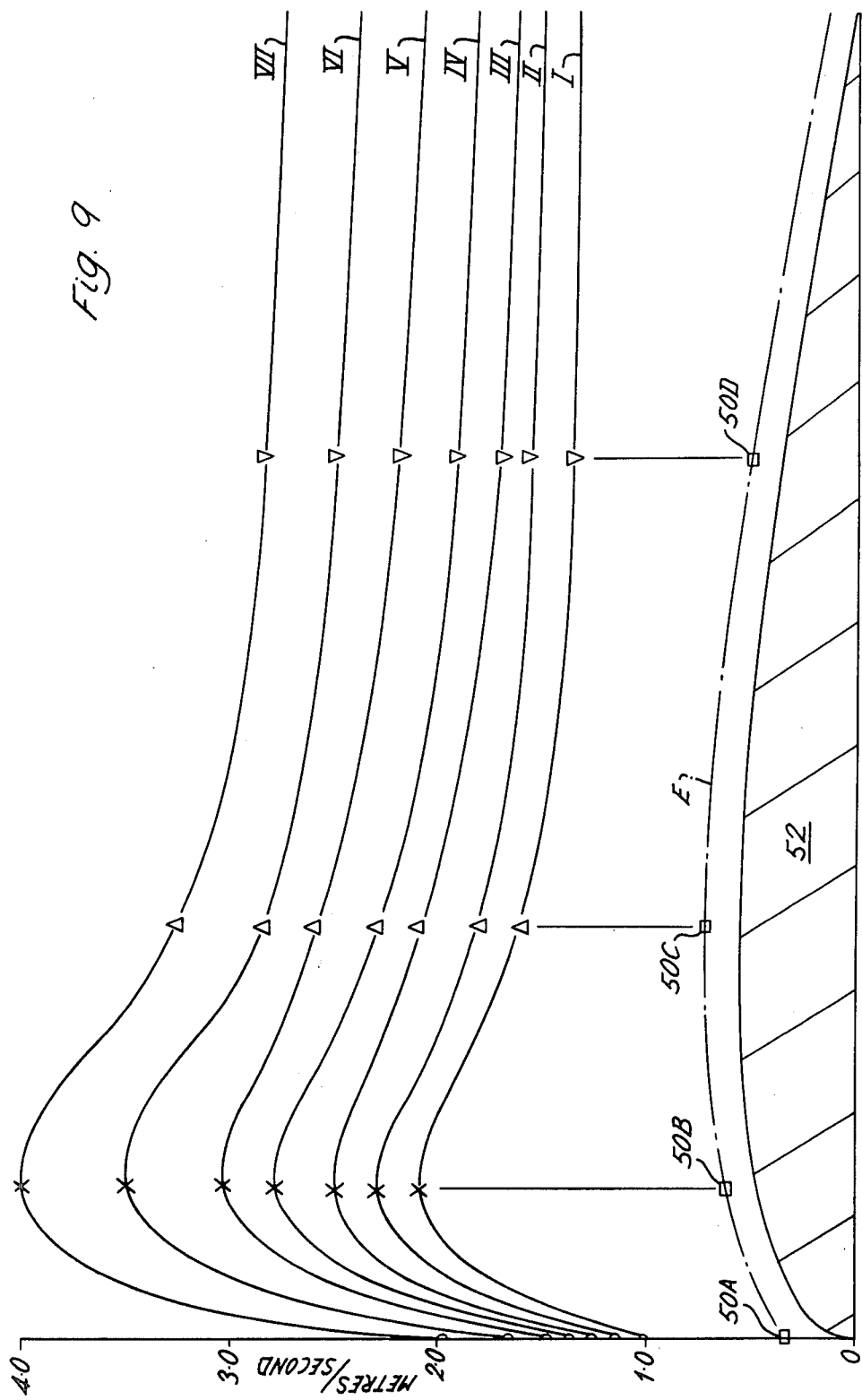

DEVICES FOR DETECTING FLUID FLOW

This is a continuation of application Ser No. 742,183 filed Nov. 16, 1976, now abandoned.

This invention relates to devices for detecting fluid flow.

If a solid body is placed in a flowing fluid, then at a Reynolds number characteristic of the system, vortices will form in the fluid and will be released, or shed, alternately from each side of the body. The rate of vortex shedding depends on the flow rate.

Several types of flowmeter are available which measure the rate of vortex shedding, for example by detecting the pressure differential between the sides of the body as each vortex is shed, or by detecting the differential cooling effect on thermistors as the flow velocity changes locally. In another type of meter, a triangular body in the flow is pivoted at its upstream apex and the frequency of oscillation about the pivot is measured.

According to the invention, a device for investigating a flowing fluid comprises an elongated body; means to support the body so that when a substantial portion of its length is exposed to the flowing fluid with the longitudinal axis of said portion arranged substantially transverse to the fluid flow said portion can be caused to vibrate by vortex shedding; an electromechanical transducer coupled to said body so as to produce an electrical signal in response to vibration of said portion; and means for detecting the presence of said signal. There may also be provided means for detecting the frequency of said signal.

In one embodiment the device comprises a wire-like body supported at both ends and arranged in tension across a tube through which the fluid is to flow.

In another embodiment the device comprises an elongated body extending across a tube through which the fluid is to flow, the body having one end in contact with the tube wall and the other end in contact with the electrochemical transducer.

In another embodiment the device comprises a wire-like body supported at one end which is also coupled to the electromechanical transducer. In one arrangement the wire-like body projects into a rigid shield having a bore through which fluid can flow. In another arrangement the electromechanical transducer is enclosed in a probe from which the wire-like body projects.

In another embodiment the device comprises a wire-like body having a right angle bend, the portion of the body on one side of the bend comprising said substantial portion, the body being supported at the end remote from the substantial portion, and the electromechanical transducer being coupled to the portion other than the substantial portion.

In any embodiment, a sheet of material of relatively large surface area may be attached to said substantial portion to increase the area on which the liquid impinges.

Preferably the electromechanical transducer comprises a piezo electric crystal. Alternatively the transducer may be a strain gauge device.

The means for detecting the presence of said signal may either be connected to an indicator device or to a safety switch.

When there is also provided means for detecting the frequency of the signal, that means may be connected to a readout device such as a meter calibrated to provide a reading of, for example, volume flow rate or fluid velocity, or to a control system arranged to control the fluid flow rate or velocity.

Further according to the invention, a method of detecting fluid flow comprises arranging an elongated body so that a substantial portion of its length is exposed to the flowing fluid with the longitudinal axis of said portion transverse to the fluid flow so that said portion is caused to vibrate by vortex shedding, and detecting the vibrations by means of an electromechanical transducer coupled to said body.

The invention will be described by way of example with reference to the accompanying drawings in which:

FIG. 1 illustrates a device for measuring the rate of flow of a fluid through a tube;

FIG. 3 illustrates an aternative device for measuring the rate of flow of a fluid through a tube;

FIGS. 4A, 4B, 5A, 5B and 6 illustrate three devices for measuring the velocity of a fluid;

FIG. 8 illustrates a device for investigating the flow of a fluid near a surface; and FIG. 9 illustrates use of the device shown in FIG. 8.

Figure 2:
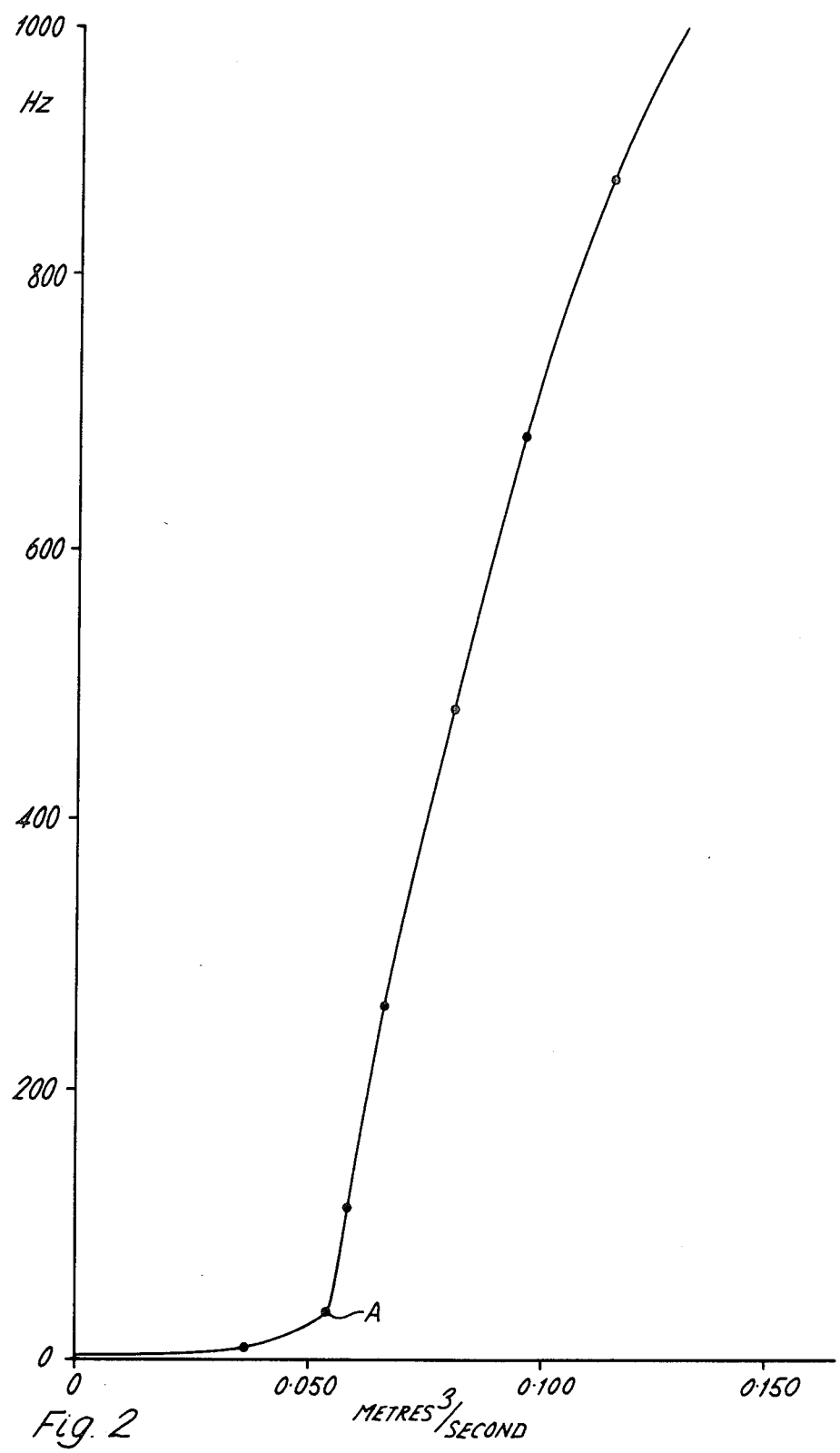
FIG. 2 illustrates a typical relationship between frequency of vibration and volume flow rate for the device shown in FIG. 1.

In FIG. 1, a wire 10 is arranged across a diameter of a tube 12, shown in section. The ends of the wire pass through and are sealed into apertures 14 in the pipe wall; one end of the wire is held by an adjustable clamping device 16 which can be adjusted to apply a tension to the wire. The other end passes through a record player pick-up device, indicated schematically by reference 18, which comprises a piezoelectric crystal 20 supported by a rubber bush 22 and with its free end in contact with the wire 10. Reference 24 indicates a conductor connecting the electrical output of the crystal to an electronic processing circuit 26 and a display meter 28. The end of the wire beyond the pick-up is held by a clamping device 30.

When a fluid flows through the pipe 12 at a rate greater than a threshold fow rate, vortices are shed alternately from the upper and lower sides of the wire, causing the wire to vibrate. The vibrations are sensed by the piezoelectric crystal 20 and converted to electrical signals which are processed by circuit 26; the meter 28 is calibrated to display a reading in appropriate units.

The frequency of vibration of the wire 10 is related to the flow rate, as shown by FIG. 2 which illustrates the relationship for a round section wire 0.15 millimeters in diameter tensioned at 0.45 Newtons. When air flows along the tube, the frequency-volume flow rate relationship is substantially linear at flow rates greater than about 0.057 cubic meters/second (point A) and up to at least 0.14 cubic meters/second. Point A indicates the transition to turbulence at the wake contraction point, and the Reynolds number at that point is 240.

Another embodiment is shown in FIG. 3 in which a rod-like body 11 extends across the bore of a pipe 13. One end of the rod is tapered and is located between projections 15 fixed to the bore wall. At the other end, the end surfaces of the rod is formed into a depression 17 in which is located one end of a needle 19 of a record-player pick-up 21. When fluid flows in the pipe 13, the rod vibrates and the vibrations are transmitted by the needle 19 to the pick-up, which may also convert the sensed vibrations into an output signal suitable for transmission through a connecting wire 23. This arrangement may be advantageous over FIG. 1 in that there are no tensioning or bowing problems, which may be associated with the use of a fine wire in a large-bore pipe.

In FIGS. 4A and 4B, a wire 25 is supported at one end by a piezoelectric crystal 27. The wire extends into a bore 29 in a rigid shield 31, which also forms a housing for the crystal 27 and which is attached to a hollow probe 33. The bore 29 is hydrodynamically shaped so that when the probe is immersed in a flowing fluid, flow through the bore is distruted as little as possible. The flow causes the wire to vibrate, at a frequency which is detected by the crystal, and an electrical signal is passed through a conductor 35 in the hollow probe. The shield protects the wire from any relatively large solid object in the fluid flow, and also from damage when the probe is not in use.

FIGS. 5A and 5B illustrate a wire 37 attached at one end to a piezo electric crystal (not shown) and extending into a short section of tube 39. The tube can be connected into a pipe of similar diameter to detect flow through the pipe, or can be immersed in a flowing fluid, in which case the tube 39 can impart a directional effect.

Figure 7:
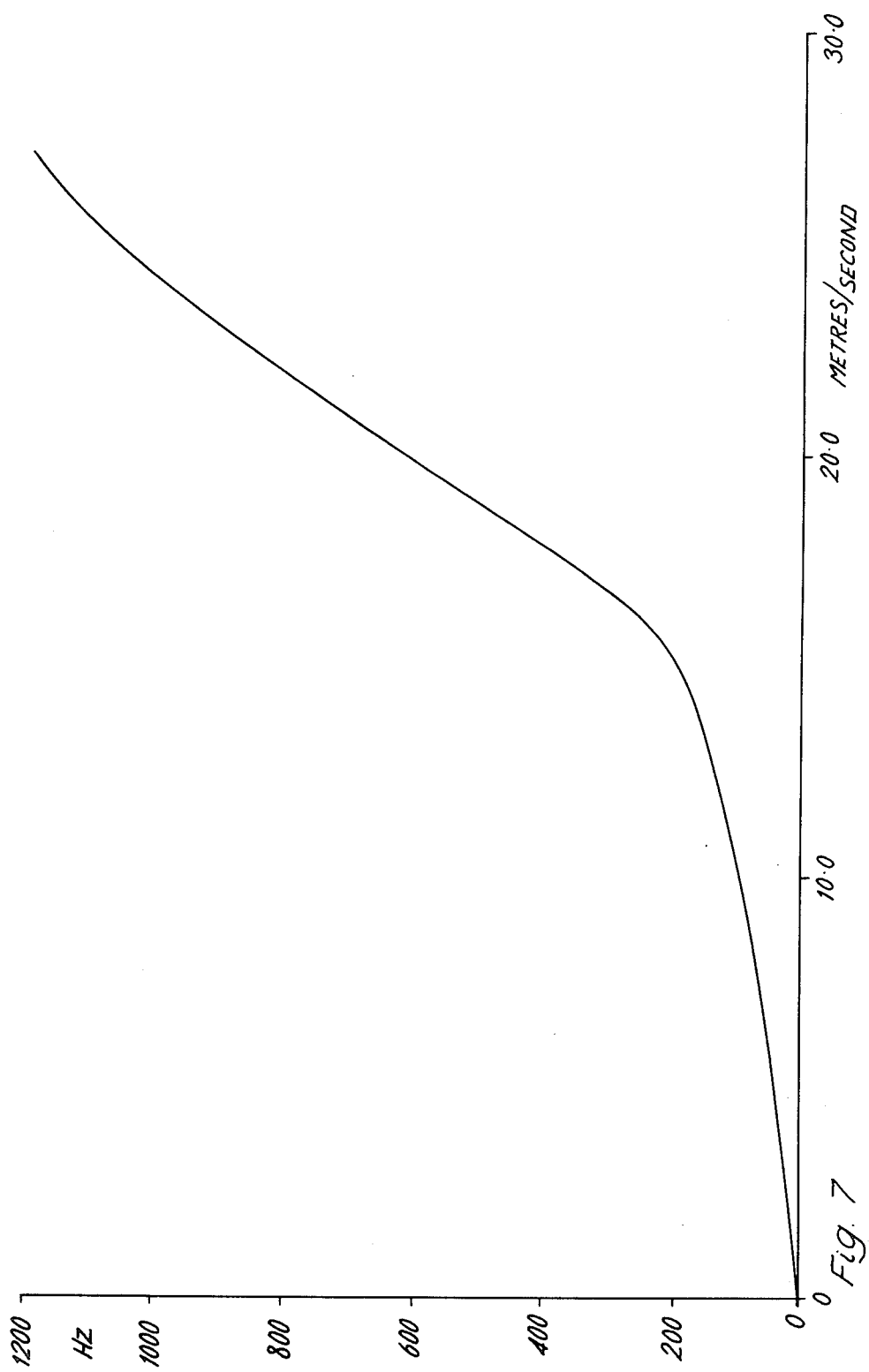
FIG. 7 illustrates a typical relationship between frequency of vibration and the flow velocity for the device shown in FIG. 6.

In FIG. 6 a wire 32 is supported at one end by a record player pick-up (not shown) enclosed in one end of a probe 34; the wire 32 projects form the probe substantially at right angles to the immediately adjacent probe walls. The probe 34 has a right angle bend 36, and is joined to a smaller-diameter section 38 through which an electrical connecting wire passes. In use the smaller-diameter section 38 is arranged to protrude through the wall of a tube containing a fluid, which flows around the wire 32 in the direction indicated by the arrow 40. Vortex shedding causes the wire 32 to vibrate, and the vibrations are detected by the pick-up and displayed after processing by a meter (not shown) outside the tube. This arrangement is particularly suitable for measuring the velocity of flow in a fluid. If the wire 32 is 0.85 millimeters in diameter and 9.0 millimeters long and is exposed to a flow of air, the relationship between detected frequency and velocity of flow is that shown in FIG. 7; a velocity between 8.20 and 28.0 meters per second corresponds to a frequency response of between 50 and 1110 Hz.

FIG. 8 illustrates an alternative device comprising a bent wire having two arms 42, 44 at right angles and which in use is arranged with the arm 42 transverse to a fluid flow indicated by the arrow 46. The arm 42 will be caused to vibrate by vortex shedding the frequency of vibration is detected by a sensor 48 attached to the arm 44. The fluid fow does not directly cause the arm 44 to vibrate, and the arm 44 transmits vibrations from arm 42 to the sensor. To increase the sensitivity of the device a sheet of material 50, indicated by the dotted lines, may be attached to the arm 42 to increase the area on which the liquid impinges. In this arrangement the sheet is shown with its surface parallel to the direction of flow, but it may be at other angles or even normal to the direction of flow.

The device shown in FIG. 8 may be used to investigate the velocity at a particular point in a fluid flow as shown in FIG. 9 in which the fluid streamlines about a wing section 52 with a section profile shape NACA 0018 are investigated by mounting four devices to protrude from the profile into the fluid flow with the centres of the respective metal sheets 50A, 50B, 50C and 50D at a constant distance of 6.3 millimeters from the surface of the wing section, as represented by the chain-dotted line E. The lines I to VII represent the measured air velocities at the four positions for seven different flow rates between 3.0 and 7.8 cubic meters per second. It has been found that use of very fine wires to investigate streamlines cause very little interference with the fluid flow, and can give an accurate picture of a velocity profile.

In the devices described above, use of wire of different dimensions will alter the flow range over which a device can operate.

Although the electromechanical transducer described is a record player pick-up, any other type of transducer capable of sensing mechanical vibrations may be used, for example a strain gauge device.

In any arrangement, instead of determining the frequency of the sensed vibrations, if provision is made to sense only their presence or absence then a go/no go device can be provided. Such a device may act as a safety switch in situations in which the absence of fluid flow could be deleterious, for example in a cooling water supply system.

The size of a device according to the invention may range from very small, e.g. with a wire sensor 2.5 millimeters long in a 5 millimeter diameter tube in the FIG. 5 configuration, or a device capable of measuring flow through pipes of the order of tens of centimeters in diameter.

A probe type of device can be inserted either through an aperture in a pipe wall, or be provided as part of a flanged section of a pipe.

When the frequency of the vibrations is determined, which may be carried out by any conventional method using suitable apparatus, it is advantageous that the logarithm of the determined frequency is approximately linearly proportional to the flow velocity.

We claim:
1. A device for detecting fluid flow in a tube comprising a wire; means to rigidly and directly fix said wire at both ends to opposing walls of said tube in tension so that when a substantial portion of its length is exposed to a flowing fluid with the longitudinal axis of said portion arranged substantially transverse to the fluid flow said portion of said wire vibrates by self-shedding of vortices; a piezoelectric transducer coupled directly to said wire at one fixed end so as to produce an electrical signal in response to vibration of said portion; and means responsive to the presence of said signal.

2. A device for detecting fluid flow comprising:
a wire-like body having a right-angle bend;
means to rigidly and directly fix the body at one end so that when the portion of the body on the side of the right-angle bend remote from the fixed end is exposed to a flowing fluid with the longitudinal axis of said portion arranged substantially transverse to the fluid flow said portion vibrates by self-shedding of vortices;
a sheet of material of relatively large surface area attached to said portion;
a piezoelectric transducer coupled directly to the wire at the fixed end so as to produce an electrical signal in response to vibration of said portion; and
means responsive to the presence of said signal.

* * * * *